(12) United States Patent
Ezzo et al.

(10) Patent No.: US 10,422,331 B2
(45) Date of Patent: Sep. 24, 2019

(54) ONE PIECE DIAPHRAGM

(71) Applicant: Ingersoll-Rand Company, Davidson, NC (US)

(72) Inventors: Mark Anthony Ezzo, Trouman, NC (US); Dale Treml, Charlotte, NC (US); James Simmons, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 203 days.

(21) Appl. No.: 15/235,890

(22) Filed: Aug. 12, 2016

(65) Prior Publication Data

US 2018/0045190 A1 Feb. 15, 2018

(51) Int. Cl.
*F04B 43/00* (2006.01)
*B29C 45/16* (2006.01)
(Continued)

(52) U.S. Cl.
CPC ...... *F04B 43/0054* (2013.01); *B29C 45/1676* (2013.01); *F04B 43/02* (2013.01);
(Continued)

(58) Field of Classification Search
CPC ...... F04B 43/0027; F04B 43/02; F15B 15/10; F16J 3/02
USPC .................................................. 92/99, 103 F
See application file for complete search history.

(56) References Cited

U.S. PATENT DOCUMENTS 2,710,629 A * 6/1955 Price .......................... F16J 3/02
248/346.11
4,238,992 A 12/1980 Tuck, Jr.
(Continued)

FOREIGN PATENT DOCUMENTS

DE 20 2008 007700 U1 10/2009
EP 0 033 096 A2 8/1981
GB 1 530 096 A 10/1978

OTHER PUBLICATIONS

European Search Report; Application No. 17186019.0-1616; dated Dec. 12, 2017.

*Primary Examiner* — F Daniel Lopez
*Assistant Examiner* — Matthew Wiblin
(74) *Attorney, Agent, or Firm* — Jones IP Group; Wayne A. Jones

(57) ABSTRACT

Illustrative embodiments of diaphragm assemblies for diaphragm pumps and methods for manufacturing such diaphragm assemblies are disclosed. In at least one illustrative embodiment, a diaphragm pump may include an inflexible central core and a flexible diaphragm body surrounding the inflexible central core. The inflexible central core may include a reinforced thermoplastic and the flexible diaphragm body may include a thermoplastic elastomer. The flexible diaphragm body is bonded directly to the inflexible central core. The diaphragm assembly may include a mounting bolt having a head end and a threaded end. The inflexible central core surrounds the head end of the mounting bolt and the threaded end of the mounting bolt extends outside of the inflexible central core. The inflexible central core may include multiple raised features that cooperate to define cavities in the inflexible central core. The flexible diaphragm body fills the cavities of the inflexible central core.

29 Claims, 5 Drawing Sheets

(51) Int. Cl.
*F04B 43/02* (2006.01)
*F04B 45/04* (2006.01)
*F16J 3/02* (2006.01)
*B29K 23/00* (2006.01)
*B29K 27/00* (2006.01)
*B29K 67/00* (2006.01)
*B29K 77/00* (2006.01)
*B29K 105/16* (2006.01)
*B29K 509/08* (2006.01)
*B29L 31/00* (2006.01)

(52) U.S. Cl.
CPC ............ *F04B 43/026* (2013.01); *F04B 45/04* (2013.01); *F04B 45/043* (2013.01); *F16J 3/02* (2013.01); *B29K 2023/12* (2013.01); *B29K 2027/16* (2013.01); *B29K 2067/006* (2013.01); *B29K 2077/00* (2013.01); *B29K 2105/16* (2013.01); *B29K 2509/08* (2013.01); *B29L 2031/7496* (2013.01)

(56) References Cited

U.S. PATENT DOCUMENTS

| | | | |
|---|---|---|---|
| 4,247,264 A | 1/1981 | Wilden | |
| 4,270,441 A | 6/1981 | Tuck, Jr. | |
| D275,858 S | 10/1984 | Wilden | |
| 4,549,467 A | 10/1985 | Wilden et al. | |
| D294,946 S | 3/1988 | Wilden | |
| D294,947 S | 3/1988 | Wilden | |
| 5,076,142 A * | 12/1991 | Steer | B60T 13/563 91/369.3 |
| 5,169,296 A | 12/1992 | Wilden | |
| 5,421,242 A * | 6/1995 | Bachli | H01H 35/34 92/93 |
| 5,743,170 A | 4/1998 | Pascual et al. | |
| 5,771,774 A * | 6/1998 | Stojic | B60T 17/083 29/888.06 |
| 5,957,670 A | 8/1999 | Duncan et al. | |
| 6,102,363 A | 8/2000 | Eberwein | |
| 6,230,609 B1 * | 5/2001 | Bender | F04B 43/0054 92/103 R |
| 6,257,845 B1 | 7/2001 | Jack et al. | |
| 6,357,723 B2 | 3/2002 | Kennedy et al. | |
| 6,435,845 B1 | 8/2002 | Kennedy et al. | |
| 7,063,516 B2 | 6/2006 | Bethel | |
| 7,125,229 B2 | 10/2006 | Distaso et al. | |
| 7,399,168 B1 | 7/2008 | Eberwein | |
| 8,496,451 B2 | 7/2013 | Hale et al. | |
| 2003/0217962 A1 * | 11/2003 | Childers | A61M 1/28 210/258 |
| 2011/0311379 A1 | 12/2011 | Hale et al. | |
| 2015/0056089 A1 * | 2/2015 | Gledhill, III | F16J 3/02 417/472 |

* cited by examiner

ONE PIECE DIAPHRAGM

TECHNICAL FIELD AND SUMMARY

The present disclosure relates, generally, to diaphragm pumps and, more particularly, to diaphragm assemblies for diaphragm pumps.

BACKGROUND

Double diaphragm pumps alternately pressurize and exhaust two opposing motive fluid chambers to deliver pumped media during each stroke of the pump. For example, the motive fluid chambers may be pressurized with compressed air delivered by an air motor. Each motive fluid chamber is in contact with a flexible diaphragm that separates the motive fluid chamber from a pumped media chamber. The pressurized motive fluid drives the flexible diaphragms, and the diaphragms pump the fluid media through the pumped media chambers. Typical diaphragms may include a flexible disc mounted between rigid diaphragm plates, fixed with a bolt through the diaphragm plates that attaches to a connecting shaft. The diaphragm plates, bolts, and other areas on the pumped media side of the diaphragm may allow pumped media to collect and stagnate, and in certain circumstances may allow for microorganism growth and/or recirculation of older pumped media and/or residue.

SUMMARY

According to one aspect, a diaphragm assembly for a diaphragm pump may include an inflexible central core and a flexible diaphragm body surrounding the inflexible central core. The flexible diaphragm body includes an elastomer, and the flexible diaphragm body is bonded directly to the inflexible central core. In some embodiments, the flexible diaphragm body may be mechanically, thermally, or chemically bonded directly to the inflexible central core.

In some embodiments, the diaphragm assembly may further include an attachment member having a first end and second end, wherein the inflexible central core surrounds the first end of the attachment member and the second end of the attachment member extends outside of the inflexible central core and the flexible diaphragm body. In some embodiments, the attachment member may include a mounting bolt having a head end and a threaded end, wherein the first end of the attachment member comprises the head end and the second end of the mounting bolt comprises the threaded end. In some embodiments, the inflexible central core may include an annular boss surrounding the mounting bolt, wherein the annular boss is exposed through an opening in a motive fluid chamber side of the diaphragm body, and wherein the annular boss is flush with the motive fluid chamber side of the diaphragm body.

In some embodiments, the diaphragm body may include a central portion that surrounds the inflexible central core, an annular flexible portion that surrounds the central portion, and a sealing portion that surrounds the annular flexible portion. The diaphragm body may further include a motive fluid chamber side and a pumped media chamber side, wherein the pumped media chamber side is smooth.

In some embodiments the inflexible central core may include a smooth pumped media chamber side and a motive fluid chamber side, wherein the inflexible central core includes a concave opening toward the motive fluid chamber side, wherein the motive fluid chamber side includes a plurality of raised features that cooperate to define a plurality of cavities in the inflexible central core, and wherein the flexible diaphragm body fills the cavities of the inflexible central core. In some embodiments, the raised features of the motive fluid chamber side may include a plurality of raised spokes and a plurality of concentric ridges that define the plurality of cavities in the inflexible central core.

In some embodiments, the inflexible central core may include a pumped media chamber side, a motive fluid chamber side, and a plurality of openings between the motive fluid chamber side and the pumped media chamber side, wherein the openings are circularly arranged about a central axis of the inflexible central core, and wherein the flexible diaphragm body fills the openings in the inflexible central core. In some embodiments, the inflexible central core may include a pumped media chamber side and a motive fluid chamber side, wherein the pumped media chamber side of the inflexible central core includes a plurality of depressions that are circularly arranged about a central axis of the inflexible central core, and wherein the flexible diaphragm body fills the depressions of the inflexible central core.

In some embodiments, the inflexible central core may include a reinforced polymeric material and the flexible diaphragm body may include a thermoplastic elastomer. In some embodiments, the inflexible central core may include a re-melt zone at an interface between the inflexible central core and the flexible diaphragm body, wherein re-melt zone includes a mixture of the reinforced polymeric material and the thermoplastic elastomer. In some embodiments, the inflexible central core may include reinforced polybutylene terephthalate and the diaphragm body may include a thermoplastic copolyester elastomer. In some embodiments, the inflexible central core may include reinforced polypropylene or polyamide and the diaphragm body may include a thermoplastic vulcanizate. In some embodiments, the inflexible central core may include reinforced polyvinylidene fluoride, and the diaphragm body may include flexible polyvinylidene fluoride.

In some embodiments, the inflexible central core may further include a coating that chemically adheres the inflexible central core to the flexible diaphragm body.

According to another aspect, a method for manufacturing a diaphragm assembly for a diaphragm pump includes molding an inflexible central core, wherein the inflexible central core includes a reinforced thermoplastic, and molding a flexible diaphragm body around the inflexible central core, wherein the flexible diaphragm body includes an elastomer, and wherein the flexible diaphragm body is bonded directly to the inflexible central core. In some embodiments, molding the inflexible central core may further include molding an inflexible hub of the inflexible central core around an attachment member having a first end and second end, wherein the inflexible hub surrounds the first end of the attachment member and the second end of the attachment member extends outside of the inflexible hub. In some embodiments, molding the inflexible central core may include injection-molding the inflexible central core and molding the flexible diaphragm body may include injection-molding the inflexible central core.

In some embodiments, molding the flexible diaphragm body may include melting a re-melt zone of the inflexible central core and thereby bonding the inflexible central core and the flexible diaphragm body. In some embodiments, the method may further include preheating the inflexible central core in response to molding the inflexible central core, wherein molding the flexible diaphragm body includes molding the flexible diaphragm body in response to preheating the inflexible central core. In some embodiments, the inflexible central core may include reinforced polybutylene terephthalate and the diaphragm body may include a thermoplastic copolyester elastomer. In some embodiments, the inflexible central core may include reinforced polypropylene or polyamide and the diaphragm body may include a thermoplastic vulcanizate. In some embodiments, the inflexible central core may include reinforced polyvinylidene fluoride and the diaphragm body may include a flexible polyvinylidene fluoride.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
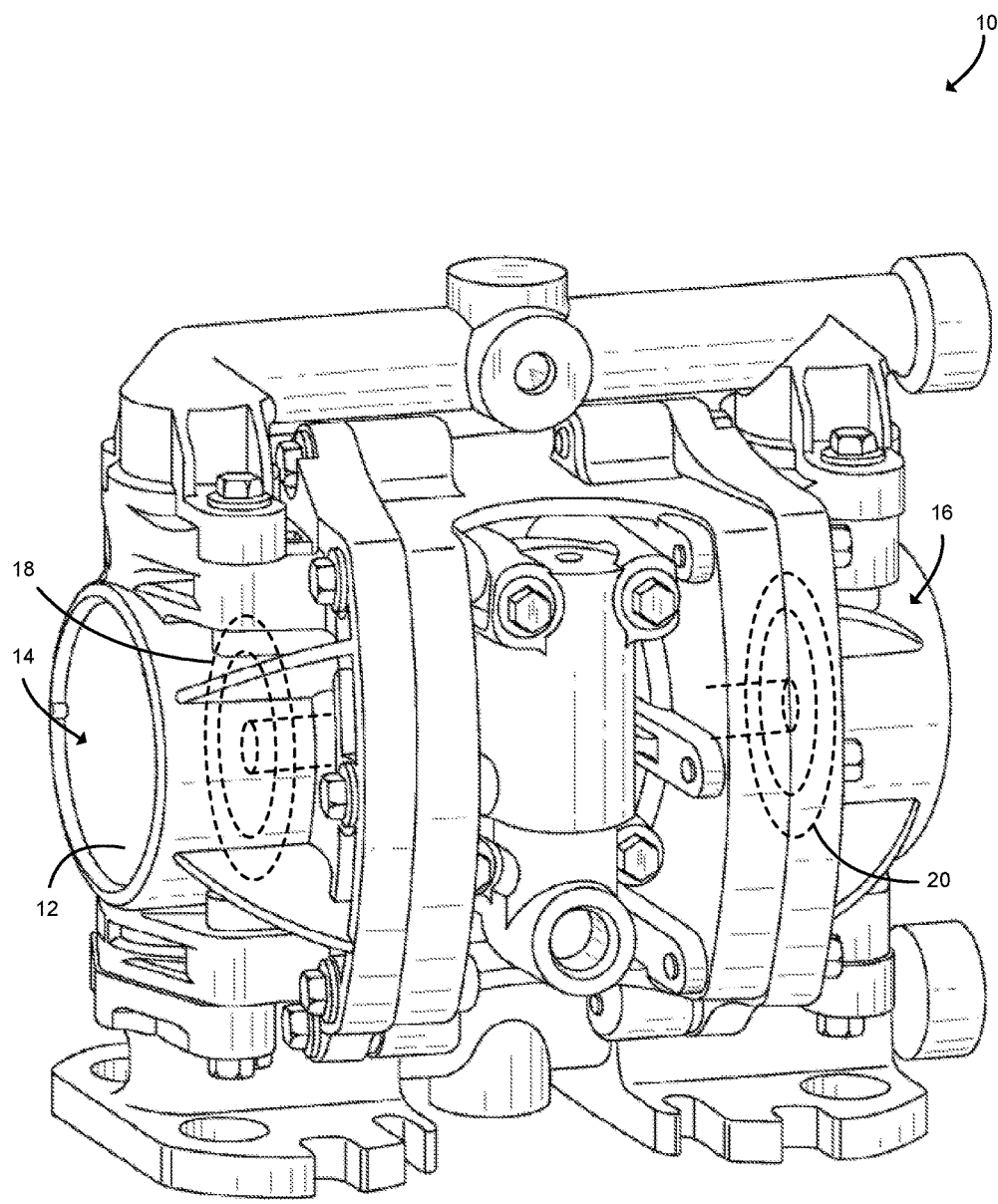
FIG. 1 is a front perspective view of one illustrative embodiment of a double diaphragm pump.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention.

Referring now to FIG. 1 one illustrative embodiment of a diaphragm pump 10 is shown. The pump 10 of FIG. 1 is illustratively embodied as an air-operated double diaphragm pump. It is contemplated that, in other embodiments, the pump 10 might be embodied as a single diaphragm pump or other type of diaphragm pump. In the illustrative embodiment, the pump 10 has a housing 12 that defines a cavity 14 and a cavity 16. The housing 12 is illustratively comprised of three sections coupled together by fasteners. The cavities 14, 16 of the pump 10 are each separated by a respective flexible diaphragm assembly 18, 20 into a pumped media chamber and a motive fluid chamber. The diaphragm assemblies 18, 20 are interconnected by a shaft, such that when the diaphragm assembly 18 is moved to increase the volume of the associated pumped media chamber, the other diaphragm assembly 20 is simultaneously moved to decrease the volume of the associated pumped media chamber, and vice versa.

Figure 2:
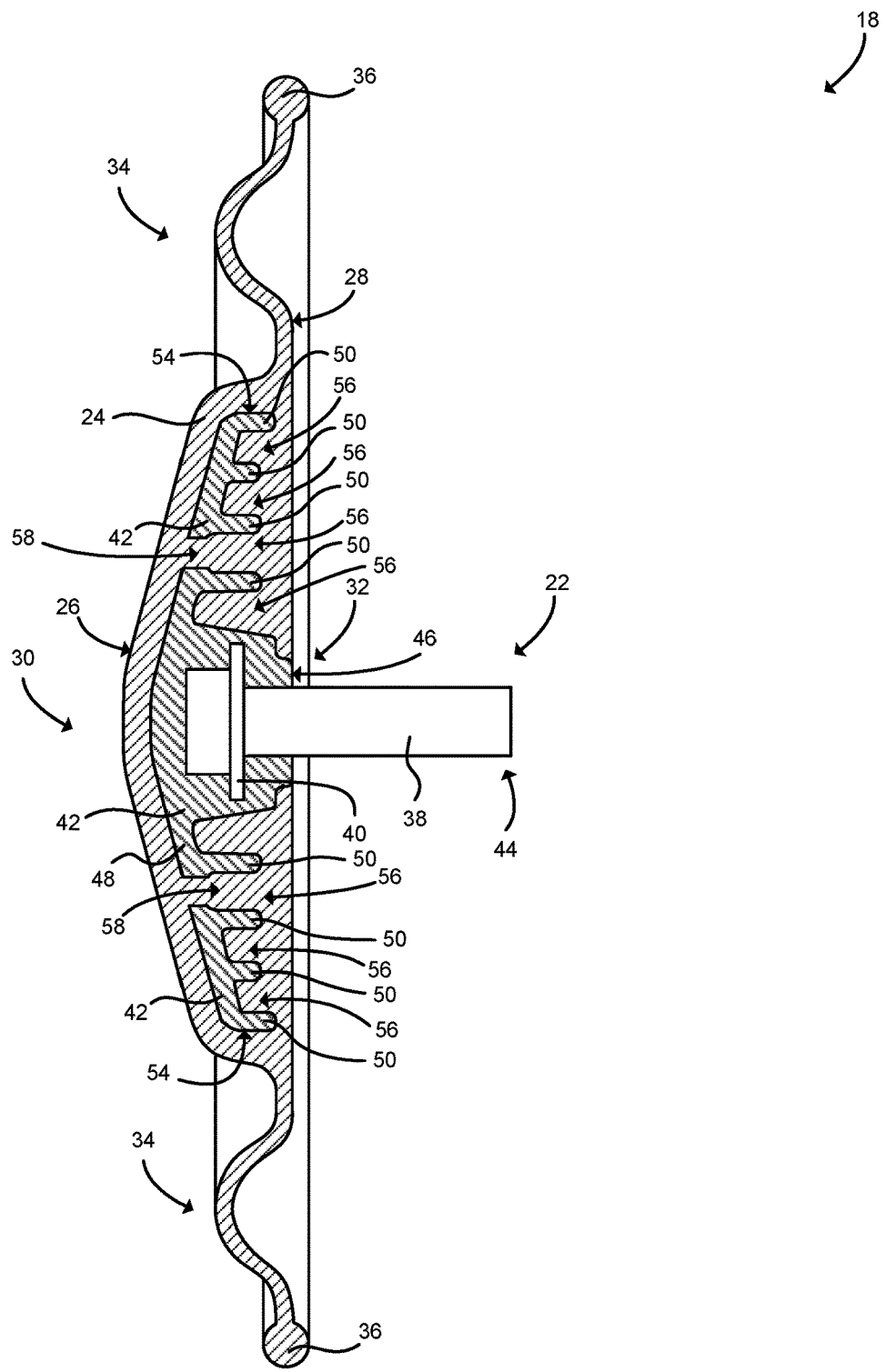
FIG. 2 is a cross-sectional view of one illustrative embodiment of a diaphragm assembly of the diaphragm pump of FIG. 1.

Referring now to FIG. 2, a cross-sectional view of one illustrative embodiment of a diaphragm assembly 18 is shown. The diaphragm assembly 18 includes an inflexible central core 22 that is surrounded by a flexible diaphragm body 24. The flexible diaphragm body 24 is flexible and is made of a thermoplastic elastomer material. For example, the flexible diaphragm body 24 may be embodied as a thermoplastic vulcanizate such as Santoprene®, which is commercially available from Exxon Mobil Corporation. As another example, the flexible diaphragm body 24 may be embodied as a thermoplastic copolyester elastomer such as Hytrel®, which is commercially available from E. I. du Pont de Nemours and Company. As an additional example, the flexible diaphragm body 24 may be embodied as flexible polyvinylidene fluoride (PVDF) such as flexible Kynar®, which available commercially from Arkema. Additionally, although FIG. 2 illustrates a single diaphragm assembly 18, it should be understood that both of the diaphragm assemblies 18, 20 of the illustrative double diaphragm pump 10 may be identical. For example, the diaphragm assemblies 18, 20 may be installed in the illustrative double diaphragm pump 10 in reverse orientations.

As shown in FIG. 2, the flexible diaphragm body 24 has a pumped media side 26 and a motive fluid side 28. The flexible diaphragm body 24 further includes a central portion 30 that is substantially flat on the motive fluid side 28 and is generally domed on the pumped media side 26. As shown, the central portion 30 surrounds the inflexible central core 22. Part of the inflexible central core 22 extends through an opening 32 of the flexible diaphragm body 24.

The flexible diaphragm body 24 bonds directly with the inflexible central core 22. In particular, the flexible diaphragm body 24 may bond thermally, mechanically, or chemically with the inflexible central core 22. For example, a zone of the inflexible central core 22 at the interface between the inflexible central core 22 and the flexible diaphragm body 24 may be re-melted and mixed with the material of the flexible diaphragm body 24. As another example, the flexible diaphragm body 24 may be mechanically attached to the inflexible central core 22 by filling recesses in the inflexible central core 22 or otherwise establishing a mechanically interlocking interface between the inflexible central core 22 and the flexible diaphragm body 24. As another example, the inflexible central core 22 may include a coating that chemically adheres the inflexible central core 22 to the flexible diaphragm body 24.

The flexible diaphragm body 24 further includes an annular flexible portion 34 that surrounds the central portion 30 and a bead 36 that surrounds the annular flexible portion 34. The bead 36 may be received in the housing 12 of the diaphragm pump 10, dividing the cavity 14 into a motive fluid chamber on the motive fluid side 28 and a pumped media chamber on the pumped media side 26. Although illustrated as a bead 36, it should be understood that in some embodiments the flexible diaphragm body 24 may include any appropriate surface and/or feature for sealing the diaphragm assembly in the housing 12 of the diaphragm pump 10. For example, in some embodiments the flexible diaphragm body 24 may include a flat gasket surrounding the annular flexible portion 34 that may be received in the housing 12 of the diaphragm pump 10. In use, the annular flexible portion 34 may allow the central portion 30 to move in and out relative to the bead 36, varying the volumes of the motive fluid chamber and the pumped media chamber. As shown in FIG. 2, the pumped media side 26 of the flexible diaphragm body 24 is smooth. Therefore, the diaphragm assembly 18 may not allow pumped media to collect and stagnate against the flexible diaphragm body 24.

Referring now to FIGS. 2-5, the inflexible central core 22 includes a mounting bolt 38 and washer 40, surrounded by an inflexible hub 42. The mounting bolt 38 and washer 40 may be made of a metallic material such as 316L stainless steel. As best shown in FIG. 2, an end 44 of the bolt 38 extends through the opening 32 of the flexible diaphragm body 24. The end 44 of the bolt 38 may be threaded, allowing the diaphragm assembly 18 to be mechanically attached to other components. For example, the bolt 38 may be attached to a shaft of the pump 10. Although illustrated as a mounting bolt 38, it should be understood that in other embodiments the inflexible central core 22 may include a different attachment member capable of attaching the diaphragm assembly 18 to the diaphragm pump 10, such as a female-threaded receiver or other fastener.

The inflexible hub 42 surrounds the bolt 38 and washer 40 and is made of a glass-reinforced thermoplastic. For example, the inflexible hub 42 may be embodied as glass-filled polybutylene terephthalate (PBT), long-glass-filled polypropylene (PP), or polyamide (PA). As an additional example, the inflexible hub 42 may be embodied as polyvinylidene fluoride (PVDF) such as Kynar. Although illustrated as a reinforced polymeric material, it should be understood that in some embodiments the inflexible hub 42 may be made of metallic or other non-polymeric material and be mechanically thermally, or chemically bonded to the flexible diaphragm body 24. The inflexible hub 42 includes an annular boss 46 that surrounds the bolt 38 and extends through the opening 32 of the flexible diaphragm body 24. The boss 46 is flush with the motive fluid side 28 of the flexible diaphragm body 24.

Figure 4:
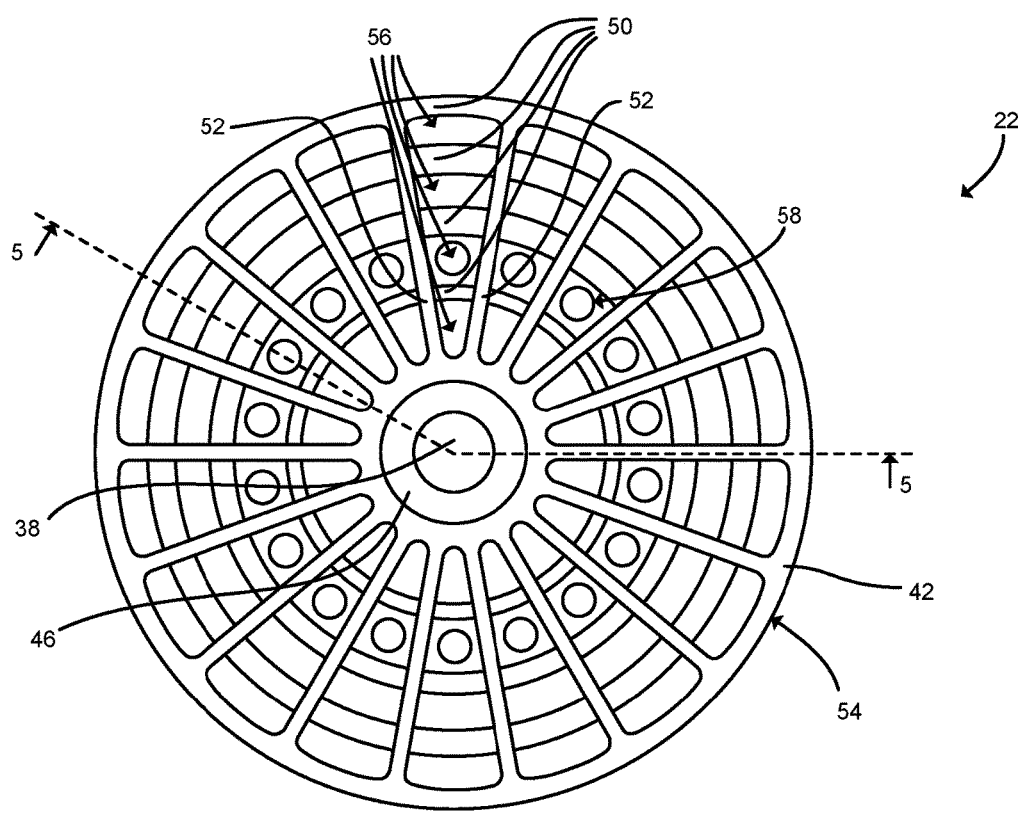
FIG. 4 is a bottom plan view of the central core of FIG. 3.
Figure 5:
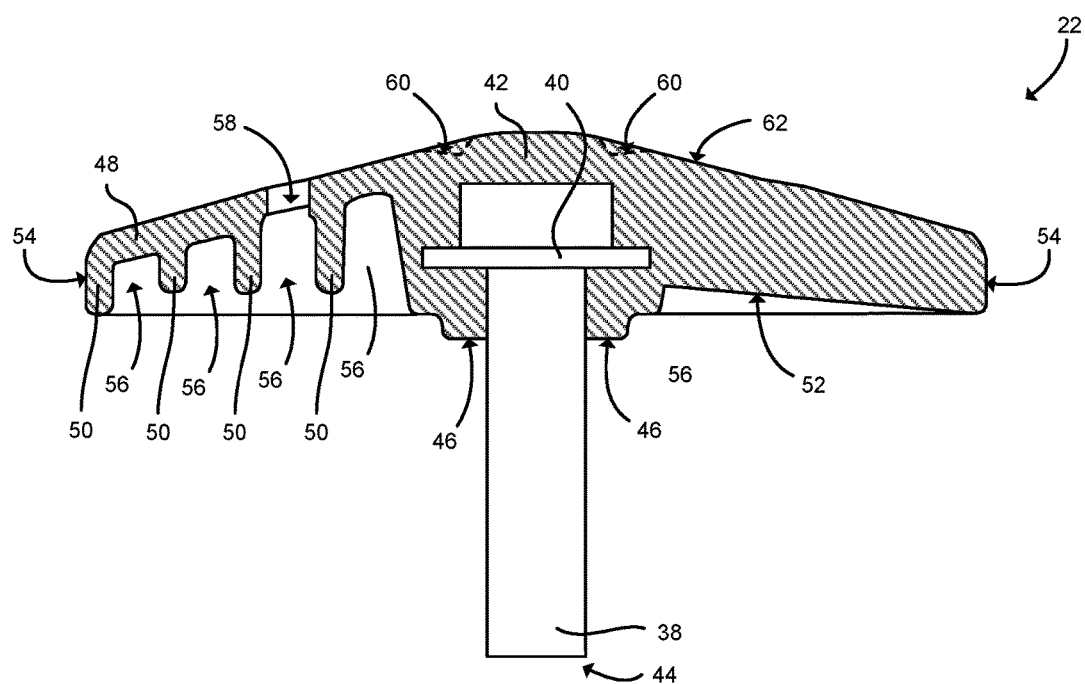
FIG. 5 is a cross-sectional view of the central core of FIGS. 3-4, taken along the line 5-5 in FIG. 4.

The inflexible hub 42 further includes a domed disc 48 and a series of integrally molded concentric ridges 50. The domed disc 48 is positioned toward the pumped media side 26 of the flexible diaphragm body 24 and includes a concave opening toward the motive fluid side 28 of the flexible diaphragm body 24. The concentric ridges 50 extend from the domed disc 48 toward the motive fluid side 28 of the flexible diaphragm body 24. As best shown in FIGS. 4 and 5, the inflexible hub 42 further includes a series of integrally molded radial spokes 52 extending radially from the boss 46 to an edge 54 of the domed disc 48. The concentric ridges 50 and the radial spokes 52 cooperate to define multiple cavities 56 within the inflexible hub 42. As shown in FIG. 2, the flexible diaphragm body 24 surrounds the inflexible hub 42 and fills the cavities 56. Filling the cavities 56 may improve the strength of the mechanical, chemical, and/or thermal bond between the flexible diaphragm body 24 and the inflexible hub 42. For example, the cavities 56 may provide a mechanically interlocking interface and/or may provide additional surface area for thermal or chemical bonding. Additionally, although illustrated as including the concentric ridges 50 and the radial spokes 52, it should be understood that in other embodiments the inflexible hub 42 may include other raised features extending from the domed disc 48 toward the motive fluid side 28 that cooperate to define the cavities 56.

Figure 3:
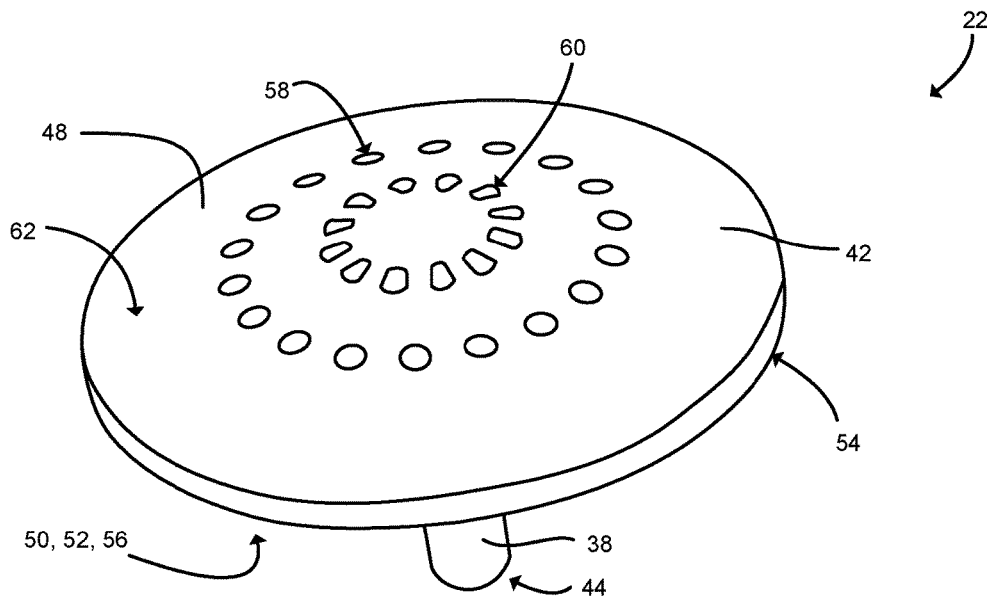
FIG. 3 is a perspective view of a central core of the diaphragm assembly of FIGS. 1-2.

The inflexible hub 42 further includes several through-holes 58. Each through-hole 58 is an opening in the domed disc 48. As best shown in FIGS. 3 and 4, the through-holes 58 may be positioned circularly about a central axis of the domed disc 48. As shown in FIG. 2, the flexible diaphragm body 24 surrounds the inflexible hub 42 and fills the through-holes 58. Similar to the cavities 56, filling the through-holes 58 may improve the strength of the mechanical, chemical, and/or thermal bond between the flexible diaphragm body 24 and the inflexible hub 42. For example, the through-holes 58 may provide a mechanically interlocking interface and/or may provide additional surface area for thermal or chemical bonding.

As best shown in FIGS. 3 and 5, the inflexible hub 42 may further include several depressions 60 in a pumped media side 62 of the domed disc 48. The depressions 60 may be positioned circularly around the pumped media side 62 of the domed disc 48. Each depression 60 may not pass completely through the domed disc 48. Similar to the cavities 56 and the through-holes 58, the flexible diaphragm body 24 may also fill the depressions 60. Filling the depressions 60 may improve the strength of the mechanical, chemical, and/or thermal bond between the flexible diaphragm body 24 and the inflexible hub 42. For example, the depressions 60 may provide a mechanically interlocking interface and/or may provide additional surface area for thermal or chemical bonding.

Figure 6:
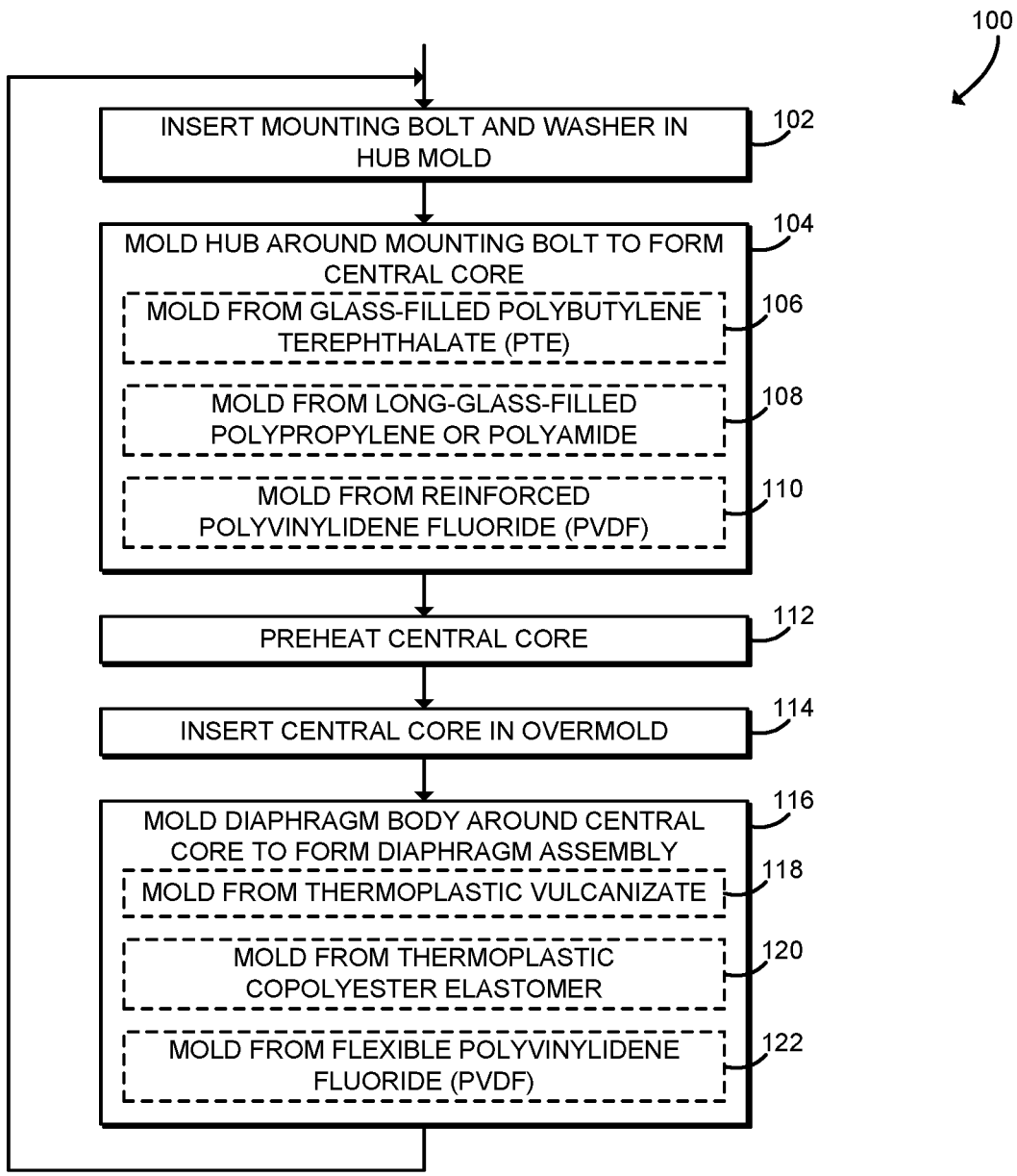
FIG. 6 is a simplified flow diagram of at least one embodiment of a method for manufacturing the diaphragm assembly of FIGS. 1-2.

Referring now to FIG. 6, one illustrative embodiment of a method 100 for manufacturing a diaphragm assembly 18 is shown as a simplified flow diagram. The method 100 begins in block 102, in which a mounting bolt 38 and an attached washer 40 is inserted in a mold for an inflexible hub 42. In block 104, the inflexible hub 42 is molded around the mounting bolt 38 to form the inflexible central core 22. Any appropriate molding technique may be used to flow melted thermoplastic material around the mounting bolt 38 to form the predefined shape of the inflexible hub 42. For example, the inflexible hub 42 may be injection-molded, compression-molded, transfer-molded, or cast. Additionally, although illustrated as the inflexible hub 42 being molded around the mounting bolt 38, it should be understood that in some embodiments the mounting bolt 38 may be mechanically attached to the inflexible hub 42, for example by being screwed into an opening of the inflexible hub 42. As described above, the inflexible hub 42 may be molded from a glass-reinforced thermoplastic. In some embodiments, in block 106, the inflexible hub 42 may be molded from glass-filled polybutylene terephthalate (PBT). In some embodiments, in block 108, the inflexible hub 42 may be molded from long-glass-filled polypropylene (PP) or polyamide (PA). In some embodiments, in block 110, the inflexible hub 42 may be molded from reinforced polyvinylidene fluoride (PVDF). After being molded, the inflexible central core 22 may be removed from the hub mold.

In block 112, the inflexible central core 22 is preheated to a predetermined temperature. The predetermined temperature depends upon the thermoplastic material used to construct the inflexible hub 42. In particular, the predetermined temperature is less than the glass-transition temperature of the material used to construct the inflexible hub 42. Thus, preheating the inflexible central core 22 does not cause the inflexible hub 42 to melt.

In block 114, the inflexible central core 22 is inserted in an overmold for the flexible diaphragm body 24. In block 116, the flexible diaphragm body 24 is molded around the inflexible central core 22 to form the diaphragm assembly 18. Any appropriate molding technique may be used to flow melted thermoplastic elastomer material around the inflexible central core 22 to form the predefined shape of the flexible diaphragm body 24. For example, the flexible diaphragm body 24 may be injection-molded, compression-molded, transfer-molded, or cast. As the flexible diaphragm body 24 is molded, the hot, melted thermoplastic elastomer material may cause part of the inflexible central core 22 to heat past its glass-transition temperature. Thus, during molding, a zone of material of the inflexible central core 22 at the interface between the inflexible central core 22 and the flexible diaphragm body 24 may re-melt. The material of this re-melt zone mixes with the melted material of the flexible diaphragm body 24, which causes the flexible diaphragm body 24 and the inflexible central core 22 to bond. Additionally, the melted thermoplastic elastomer material of the diaphragm body flows into recesses in the inflexible central core 22 (e.g., the cavities 56, the through-holes 58, and/or the depressions 60), which may cause the flexible diaphragm body 24 and the inflexible central core 22 to mechanically bond together. After being molded, the completed diaphragm body may be removed from the overmold.

As described above, the flexible diaphragm body 24 may be molded from a thermoplastic elastomer. In some embodiments, in block 118, the flexible diaphragm body 24 may be molded from a thermoplastic vulcanizate, such as Santorprene. The thermoplastic vulcanizate may be used for the flexible diaphragm body 24 if the inflexible hub 42 is constructed from long-glass-filled PP or PA. In some embodiments, in block 120, the flexible diaphragm body 24 may be molded from a thermoplastic copolyester elastomer, such as Hytrel. The thermoplastic copolyester elastomer may be used for the flexible diaphragm body 24 if the inflexible hub 42 is constructed from glass-filled PBT. In some embodiments, in block 122, the flexible diaphragm body 24 may be molded from a flexible polyvinylidene fluoride (PVDF), such as Kynar. The flexible PVDF may be used for the flexible diaphragm body 24 if the inflexible hub 42 is constructed from reinforced PVDF.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A diaphragm assembly for a diaphragm pump, the diaphragm assembly comprising:
an inflexible central core;
a flexible diaphragm body surrounding the inflexible central core,
wherein the flexible diaphragm body comprises an elastomer, and wherein the flexible diaphragm body is bonded directly to the inflexible central core;
wherein the inflexible central core comprises a reinforced polymeric material and the flexible diaphragm body comprises a thermoplastic elastomer; and
wherein the inflexible central core comprises reinforced polybutylene terephthalate, and the flexible diaphragm body comprises a thermoplastic copolyester elastomer.

2. The diaphragm assembly of claim 1, wherein the reinforced polybutylene terephthalate comprises glass filled polybutylene terephthalate.

3. The diaphragm assembly of claim 1, further comprising an attachment member having a first end and a second end, wherein the inflexible central core is molded around the first end of the attachment member and the second end of the attachment member extends outside of the inflexible central core and the flexible diaphragm body.

4. The diaphragm assembly of claim 3, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

5. The diaphragm assembly of claim 1, wherein the inflexible central core comprises a re-melt zone at an interface between the inflexible central core and the flexible diaphragm body, wherein the re-melt zone includes a mixture of the reinforced polymeric material and the thermoplastic elastomer.

6. The diaphragm assembly of claim 1, wherein the inflexible central core comprises a generally domed pumped media chamber side and a motive fluid chamber side, wherein the inflexible central core includes a concave opening toward the motive fluid chamber side.

7. The diaphragm assembly of claim 6, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

8. The diaphragm assembly of claim 1,
wherein the inflexible central core comprises a pumped media chamber side and a motive fluid chamber side and a plurality of openings between the motive fluid chamber side and the pumped media chamber side;
wherein the motive fluid chamber side comprises a plurality of raised features that cooperate to define a plurality of cavities in the inflexible central core;
wherein the flexible diaphragm body fills the plurality of cavities of the inflexible central core; and
wherein the raised plurality of features of the motive fluid chamber side comprise a plurality of spokes and a plurality of concentric ridges that define the plurality of cavities in the inflexible central core.

9. The diaphragm assembly of claim 8, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

10. The diaphragm assembly of claim 1, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

11. A diaphragm assembly for a diaphragm pump, the diaphragm assembly comprising:
an inflexible central core;
a flexible diaphragm body surrounding the inflexible central core,
wherein the flexible diaphragm body comprises an elastomer, and wherein the flexible diaphragm body is bonded directly to the inflexible central core;
wherein the inflexible central core comprises a reinforced polymeric material and the flexible diaphragm body comprises a thermoplastic elastomer; and
wherein the inflexible central core comprises reinforced polypropylene or polyamide, and the flexible diaphragm body comprises a thermoplastic vulcanizate.

12. The diaphragm assembly of claim 11, wherein the reinforced polypropylene comprises long glass filled polypropylene.

13. The diaphragm assembly of claim 11, further comprising an attachment member having a first end and a second end, wherein the inflexible central core is molded around the first end of the attachment member and the second end of the attachment member extends outside of the inflexible central core and the flexible diaphragm body.

14. The diaphragm assembly of claim 13, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

15. The diaphragm assembly of claim 11, wherein the inflexible central core comprises a re-melt zone at an interface between the inflexible central core and the flexible diaphragm body, wherein the re-melt zone includes a mixture of the reinforced polymeric material and the thermoplastic elastomer.

16. The diaphragm assembly of claim 11, wherein the inflexible central core comprises a generally domed pumped media chamber side and a motive fluid chamber side, wherein the inflexible central core includes a concave opening toward the motive fluid chamber side.

17. The diaphragm assembly of claim 16, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

18. The diaphragm assembly of claim 11,
wherein the inflexible central core comprises a pumped media chamber side and a motive fluid chamber side and a plurality of openings between the motive fluid chamber side and the pumped media chamber side;
wherein the motive fluid chamber side comprises a plurality of raised features that cooperate to define a plurality of cavities in the inflexible central core;
wherein the flexible diaphragm body fills the plurality of cavities of the inflexible central core; and
wherein the raised plurality of features of the motive fluid chamber side comprise a plurality of spokes and a plurality of concentric ridges that define the plurality of cavities in the inflexible central core.

19. The diaphragm assembly of claim 18, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

20. The diaphragm assembly of claim 11, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

21. A diaphragm assembly for a diaphragm pump, the diaphragm assembly comprising:
an inflexible central core;
a flexible diaphragm body surrounding the inflexible central core,
wherein the flexible diaphragm body comprises an elastomer, and wherein the flexible diaphragm body is bonded directly to the inflexible central core;
wherein the inflexible central core comprises a reinforced polymeric material and the flexible diaphragm body comprises a thermoplastic elastomer; and
wherein the inflexible central core comprises reinforced polyvinylidene fluoride, and the flexible diaphragm body comprises flexible polyvinylidene fluoride.

22. The diaphragm assembly of claim 21, further comprising an attachment member having a first end and a second end, wherein the inflexible central core is molded around the first end of the attachment member and the second end of the attachment member extends outside of the inflexible central core and the flexible diaphragm body.

23. The diaphragm assembly of claim 22, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

24. The diaphragm assembly of claim 21, wherein the inflexible central core comprises a re-melt zone at an interface between the inflexible central core and the flexible diaphragm body, wherein the re-melt zone includes a mixture of the reinforced polymeric material and the thermoplastic elastomer.

25. The diaphragm assembly of claim 21, wherein the inflexible central core comprises a generally domed pumped media chamber side and a motive fluid chamber side, wherein the inflexible central core includes a concave opening toward the motive fluid chamber side.

26. The diaphragm assembly of claim 25, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

27. The diaphragm assembly of claim 21,
wherein the inflexible central core comprises a pumped media chamber side and a motive fluid chamber side and a plurality of openings between the motive fluid chamber side and the pumped media chamber side;
wherein the motive fluid chamber side comprises a plurality of raised features that cooperate to define a plurality of cavities in the inflexible central core;
wherein the flexible diaphragm body fills the plurality of cavities of the inflexible central core; and
wherein the raised plurality of features of the motive fluid chamber side comprise a plurality of spokes and a plurality of concentric ridges that define the plurality of cavities in the inflexible central core.

28. The diaphragm assembly of claim 27, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

29. The diaphragm assembly of claim 21, wherein the flexible diaphragm body is over-molded on the inflexible central core, the inflexible central core being preheated to a predetermined temperature approaching the glass-transition temperature of the reinforced polymeric material before being overmolded with the thermoplastic elastomer.

* * * * *